United States Patent
Albero et al.

(10) Patent No.: US 6,704,625 B2
(45) Date of Patent: Mar. 9, 2004

(54) AIRCRAFT ARCHITECTURE WITH A REDUCED BLEED AIRCRAFT SECONDARY POWER SYSTEM

(75) Inventors: Jose Albero, Lachenaie (CA); Charles E. Lents, Rockford, IL (US); Michael K. Sahm, Avon, CT (US); Richard C. Welch, Rockford, IL (US)

(73) Assignee: Hamilton Sunstrand Corporation, Windsor Locks, CT (US)

( * ) Notice: Subject to any disclaimer, the term of this patent is extended or adjusted under 35 U.S.C. 154(b) by 58 days.

(21) Appl. No.: 10/076,898

(22) Filed: Feb. 14, 2002

(65) Prior Publication Data

US 2002/0113167 A1 Aug. 22, 2002

Related U.S. Application Data

(60) Provisional application No. 60/269,464, filed on Feb. 16, 2001.

(51) Int. Cl.$^7$ ................................................. B64B 1/24
(52) U.S. Cl. ........................... 701/3; 244/53 R; 244/58; 244/202
(58) Field of Search .............................. 701/3; 244/53 R, 244/58, 202; 60/39.163

(56) References Cited

U.S. PATENT DOCUMENTS

| | | | |
|---|---|---|---|
| 4,476,395 A | * 10/1984 | Cronin | 290/6 |
| 5,114,103 A | * 5/1992 | Coffinberry | 244/209 |
| 5,235,803 A | 8/1993 | Rodgers | 60/785 |
| 5,466,974 A | * 11/1995 | Sutrina et al. | 307/38 |
| 5,813,630 A | * 9/1998 | Williams | 244/118.5 |
| 5,977,645 A | 11/1999 | Glennon | 290/40 F |
| 6,467,725 B1 | * 10/2002 | Coles et al. | 244/58 |

* cited by examiner

*Primary Examiner*—Marthe Y. Marc-Coleman
(74) *Attorney, Agent, or Firm*—Bachman & LaPointe, P.C.

(57) ABSTRACT

The present invention relates to an improved architecture for an aircraft. The aircraft has a first engine, a first gearbox associated with the first engine, a first starter/generator associated with the gearbox, and a first motor drive connected to the first starter/generator for providing the starter/generator with electric power to start the first engine and to receive electric power from the starter/generator after the engine has been started to operate electrically driven systems onboard the aircraft. The aircraft preferably further has at least one other engine which has a gearbox and a starter/generator associated with it and at least a second motor drive connected to the starter/generator. The electrically driven systems operated by the motor drive(s) include an environmental control system, a wing anti-icing system, an aircraft control system, and the aircraft fuel system. The aircraft also includes an auxiliary power unit for supplying electrical power to at least the first motor drive for initiating operation of the first engine.

37 Claims, 2 Drawing Sheets

AIRCRAFT ARCHITECTURE WITH A REDUCED BLEED AIRCRAFT SECONDARY POWER SYSTEM

CROSS-REFERENCE TO RELATED APPLICATION

This application claims the benefit of U.S. Provisional Patent Application Ser. No. 60/269,464, filed Feb. 16, 2001, to an Improved Aircraft Architecture With A Reduced Bleed of Aircraft Secondary Power System.

BACKGROUND OF THE INVENTION

The present invention relates to an improved architecture for jet aircraft which uses onboard electric power in combination with a reduced bleed air system to power aircraft systems.

Many of today's aircraft use the extraction of thrust engine compressor bleed air to power the aircraft cabin and cargo ventilation system, the environmental control system (ECS), the wing and cowl anti-ice system and the engine start system. The extraction of engine cycle compressor core bleed air places a significant penalty on the engine cycle, reducing engine efficiency. Much of the power inherent in the extracted bleed air is purposely wasted in the bleed air control and distribution system to ensure that the hot bleed air conforms to aircraft material limits, before it is delivered to the load system. The bleed air extraction and distribution equipment required to use engine bleed is expensive to purchase and install, and relatively unreliable. Additionally, the start system hardware is used only for engine start, remaining idle for the majority of a flight.

SUMMARY OF THE INVENTION

Accordingly, it is an object of the present invention to provide an improved aircraft architecture which relies upon electrical power to operate aircraft systems instead of engine bleed air.

The foregoing object is attained by the aircraft architecture of the present invention.

In accordance with the present invention, an aircraft is provided which has a first engine, a first gearbox associated with the engine, a first starter/generator associated with the gearbox, and a first motor drive connected to the first starter/generator for providing the starter/generator with electric power to start the first engine and to receive electric power from the starter/generator after the engine has been started to operate electrically driven systems onboard the aircraft. The aircraft preferably further has at least one other engine which has a gearbox and a starter/generator associated with it and at least a second motor drive connected to the starter/generator. The electrically driven systems operated by the motor drive(s) include an environmental control system, a wing anti-icing system, an aircraft control system, and the aircraft fuel system.

The aircraft also includes an auxiliary power unit for supplying electrical power to at least the first motor drive for initiating operation of the first engine. The auxiliary power unit has a starter/generator and a motor drive connected to it, which motor drive may be connected to a battery for starting operation of the starter/generator and the auxiliary power unit.

A method for providing starting power to an aircraft and for generating electrical power to operate aircraft systems is provided. The method broadly comprises providing a first starter/generator connected to an engine and a first motor drive connected to the starter/generator, supplying electrical power to the first motor drive, conditioning the electrical power with the first motor drive and delivering the conditioned electrical power to the first starter/generator, and motoring the engine with power from the first starter/generator. The method further comprises operating the first starter/generator in a generate mode after the engine has started and supplying electrical power from the first starter/generator to a second starter/generator to start a second engine and to the first motor drive. The first motor drive utilizes the electrical power received from the first starter/generator to operate electrical systems onboard the aircraft.

Other details of the aircraft architecture with reduced bleed aircraft secondary power system and the method of the present invention, as well as other objects and advantages attendant thereto, are set forth in the following detailed description and the accompanying drawing.

BRIEF DESCRIPTION OF THE DRAWINGS

The FIGS. 1A and 1B are schematic representations of an aircraft power system in accordance with the present invention.

DETAILED DESCRIPTION OF THE PREFERRED EMBODIMENT(S)

As previously mentioned, the present invention is a set of system architectures for a jet aircraft which uses onboard electric power in combination with a reduced bleed air system to power the aircraft cabin and cargo ventilation system, the environmental control system, the wing and cowl anti-ice system, and the engine start system.

Figure 1A:
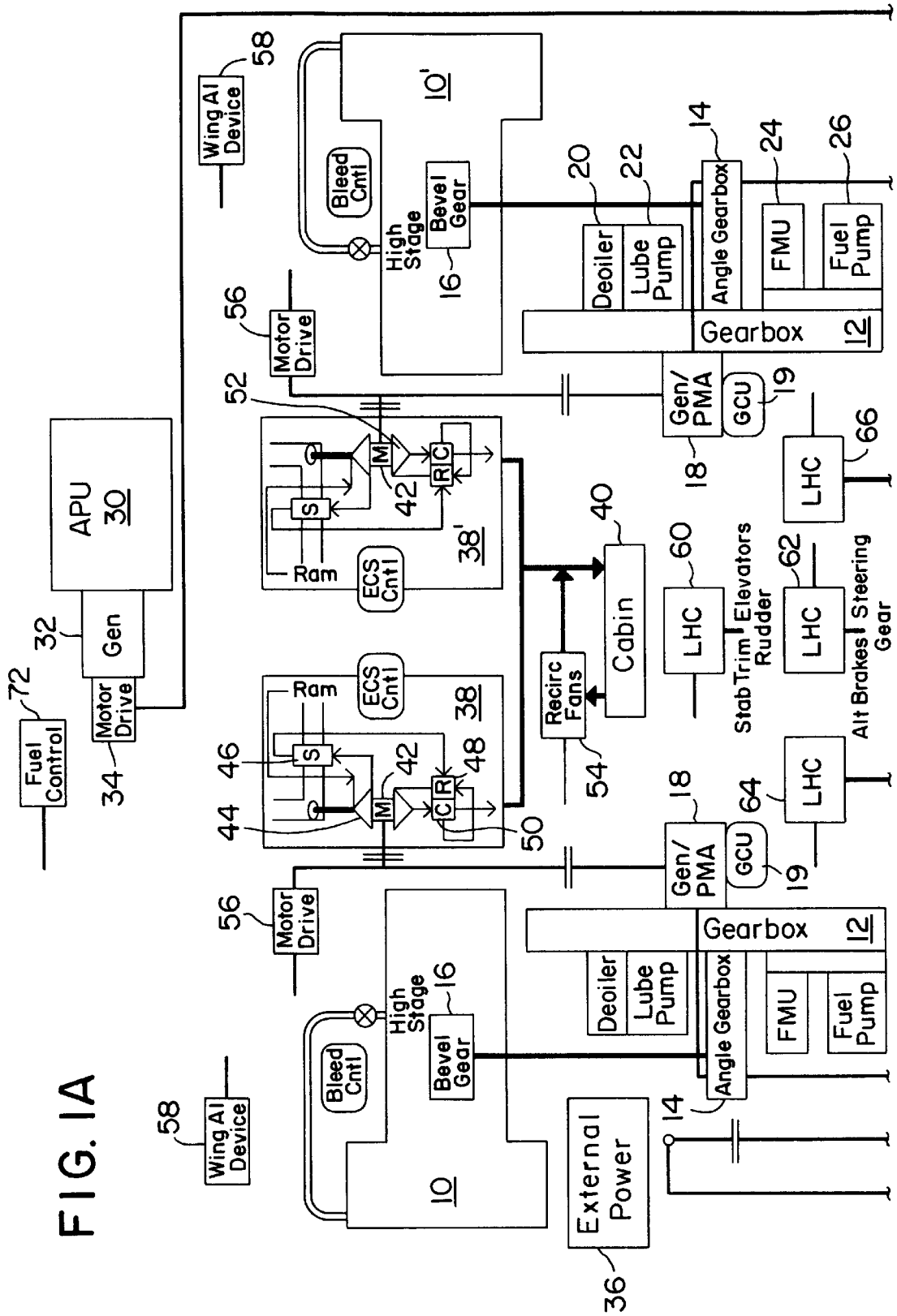
Figure 1B:
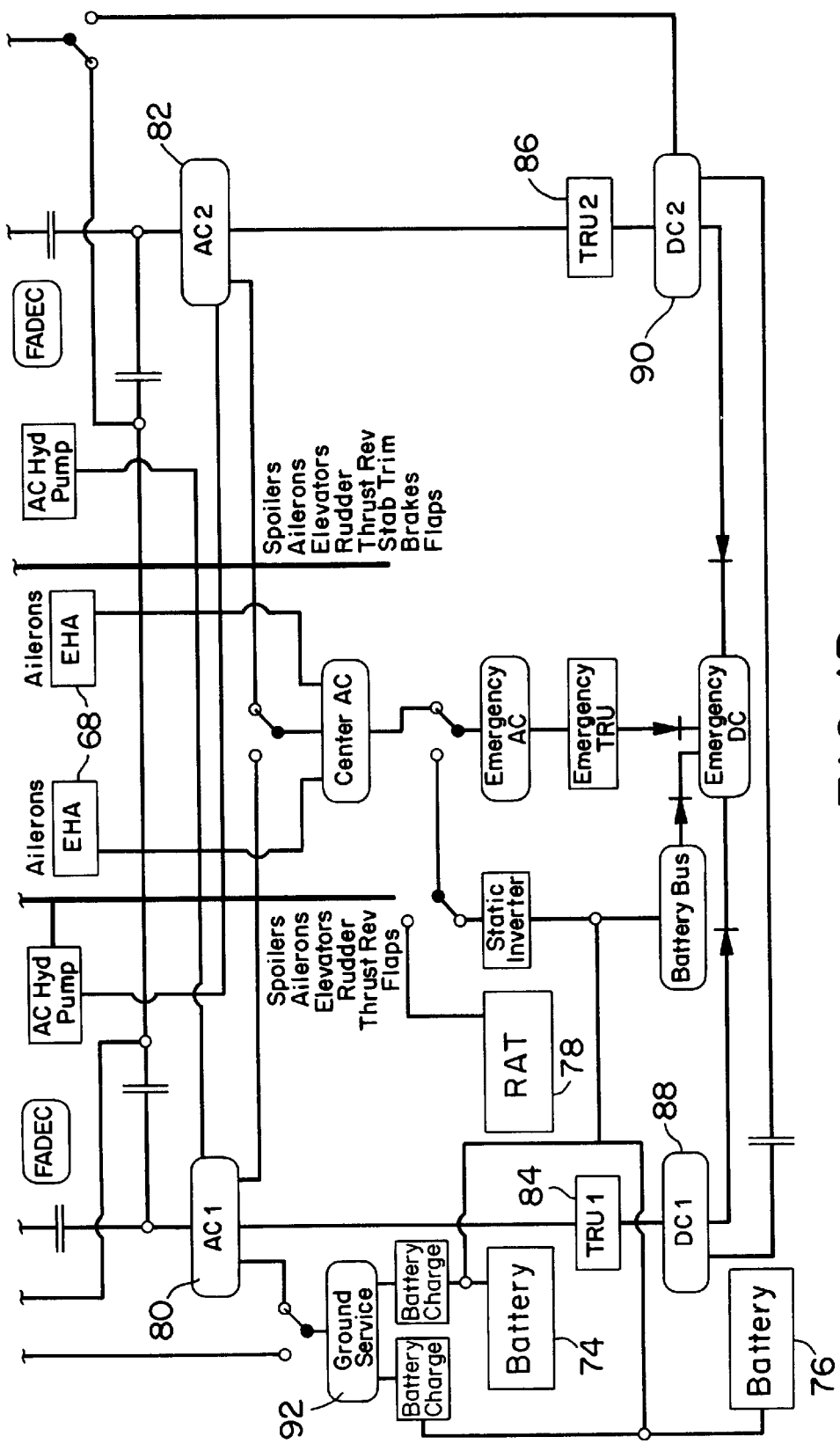

As shown in FIGS. 1A and 1B, the aircraft has a first engine 10 and a second engine 10'. The engines 10 and 10' may be mounted to a rear portion of the aircraft fuselage or may be suspended from the wings of the aircraft. The engines 10 and 10' may comprise any suitable jet engine known in the art. While only two engines 10 and 10' have been illustrated in the system shown in the Figures, it should be recognized that the aircraft could have one or more than two jet engines if desired.

Each of the engines 10 and 10' has a gearbox 12 associated with it. The gearbox 12 is connected to the engine by angle gearbox 14 and a bevel gear 16. Attached to the gearbox 12 is a starter/generator 18 which is used to start a respective engine 10 and/or 10'. Attached to each starter/generator 18 is a generator control unit 19 for regulating generator voltage. After the engine(s) 10 or 10' has been started, the gearbox 12 takes power off the engine to drive the starter/generator 18 and thus create electrical power for the aircraft. The gearbox 12 may also be used to drive, either mechanically or electrically, various engine components such as a deoiler 20, a pump 22 for the lubrication system, a fuel metering unit (FMU) 24, and a pump 26 for the fuel system.

An auxiliary power unit (APU) 30 is provided to start the engines 10 and 10'. The auxiliary power unit 30 may comprise any suitable auxiliary power unit known in the art. Preferably, the APU 30 comprises a bleedless turboalternator which supplies only electric power. The APU 30 may be located in any desired position onboard the aircraft. For example, the APU 30 could be located in a tail portion of the aircraft. Attached to the APU is a starter/generator 32 and a motor drive 34. The motor drive 34 may be connected to a battery 76 which is used to feed electrical power to the motor drive to initiate operation of the APU 30.

The aircraft architecture also includes electrically operated environmental control systems 38 and 38' for supplying conditioned air to the passenger cabin 40 and the flight deck (not shown). As shown in the Figures, each of the environmental control systems 38 and 38' has an electric motor 42 for powering the environmental control system. The environmental control system may comprise any suitable electrically driven environmental control system known in the art. In a preferred embodiment, the electrically driven environmental control system has at least one inlet (identified by the ram signal in the Figures) for receiving ram air, a compressor 44 for pressurizing the ram air, a secondary heat exchanger 46 for removing some of the heat of compression, a reheater heat exchanger 48 for initially cooling the air and later adding heat to the air after it has been dried, a condenser 50 for removing moisture from the air, and a cooling turbine 52 for expanding the cool, dry air prior to delivering the air to the cabin 40. Each of the environmental control systems 38 and 38' may have one or more recirculating fans 54 associated with it to recirculate at least a portion of the air exiting the cabin 40.

The aircraft is also provided with motor drives 56 whose operation will be discussed in more detail later. Each of the motor drives 56 is connected to one of the motors 42 in the environmental control systems 38 and 38' and to one of the starter/generators 18. The motor drives 56 drive the starter/generators 18 in a start mode and the motors 42 in a generate mode. The motor drives 56 may also be used to supply electrical power to electric fuel controls 72.

The aircraft is also provided with wing anti-icing devices 58. Preferably, the wing anti-icing devices 58 include an electrically driven compressor (not shown) for heating air and running the heated air along the leading edge portion of the wings. The electrically driven compressors may be electrically connected to the motor drives 56 in any suitable manner known in the art.

There still is a need for providing cowl anti-icing. In the system of the present invention, cowl anti-icing is performed using engine bleed air.

Still further, an aircraft control system is provided which utilizes local hydraulic centers 60, 62, 64, and 66. Each of the local hydraulic centers includes an electric hydraulic pump for providing hydraulic fluid to operate various control surfaces and aircraft systems, which electric hydraulic pump receives electrical power from one or more of the motor drives 56. The local hydraulic center 60 is preferably located in the tail of the aircraft and supplies hydraulic fluid to operate the trim stabilizers (not shown), elevators (not shown) and rudder (not shown) on the aircraft. The local hydraulic center 62 may be located in the nose of the aircraft and provides hydraulic fluid to operate the landing gear and brakes (not shown) and the aircraft steering system (not shown). The local hydraulic centers 64 and 66 may be located in the aircraft fuselage and may be used to supply hydraulic fluid to operate the spoilers (not shown), the ailerons (not shown), the elevators (not shown), the rudder (not shown), the thrust reversers (not shown) and the flaps (not shown).

The aircraft control system further has wing positioned electric hydraulic actuators 68 for operating the ailerons. The electric hydraulic actuators 68 may comprise any suitable electric hydraulic actuators known in the art. Electrical power to operate the actuators 68 may come from one or more of the motor drives 56.

The electrical system for the aircraft may comprise any suitable system known in the art. For example, it may include two batteries 74 and 76 onboard the aircraft to supply emergency power. It may also include a ram air turbine 78 to supply emergency power.

Still further the electrical system may include AC power busses 80 and 82 for supplying power to the aircraft AC loads, transformer rectifier units 84 and 86 for converting 115 V AC power for 28 V DC power, and DC power busses 88 and 90 for providing power to the aircraft DC loads. The electrical system further may include ground service load bus 92 for loads like vacuum outlets and cargo hold lights. During ground servicing, electric power is supplied to the bus 92 to allow operation of these loads.

The system shown in the Figures starts and operates in the following manner. First, the APU 30 is started. A battery 76 supplies power to the starter/generator 32 through the motor drive 34. The motor drive 34 conditions the battery power to control the speed of the starter/generator 32 as it starts the APU 30. Once the APU 30 has been started, the starter/generator 32 goes into generate mode. It supplies electrical power, such as 115 V AC power, to one of the motor drives 56, for example the motor drive associated with the starter/generator 18 for the engine 10. The motor drive 56 conditions the power and delivers it to the gearbox mounted starter/generator 18. The starter/generator 18 then motors the engine 10 until it is started. With the engine 10 started, the starter/generator 18 goes into generate mode. The other engine 10' can then be started by either the starter/generator 32 or the operating engine starter/generator 18. Once the engines 10 and 10' have been started, the APU 30 may be shut down. Once this occurs, the starter/generators 18 provide the electrical power to the aircraft's electrical systems. In the generate mode, the starter/generators 18 provide electrical power to the motor drives 56, where the power is conditioned. The conditioned power is then supplied to the environmental control system motors 42 to operate the aircraft's environmental control system and is also supplied to the other electrical systems onboard the aircraft.

The principal advantage to the aircraft system architecture of the present invention is that it relieves the engine of pneumatic bleed duties and uses as little bleed air as possible to operate the engine systems.

The design of the systems shown in the Figures provides other advantages. For example, the pneumatic start system which is typically used has been eliminated. Instead, the existing aircraft electric system is used for engine start up through a gearbox mounted starter/generator 18. Further, the pneumatically driven wing anti-ice system is replaced by an electrically driven system. Cowl anti-ice is still provided by engine bleed air but through a single bleed port instead of the traditional two port bleed system. Finally, the hydraulic system sources in the present invention are reconfigured to take advantage of a more electric architecture. The engine driven hydraulic pumps typically used are replaced by airframe mounted local hydraulic centers (LHCs) 60, 62, 64 and 66. Most notably, the conventional center hydraulic system is replaced by two small LHCs 60 and 62, one in the tail and one in the nose, and two electric hydraulic actuators 68, one in each wing driving ailerons.

Other advantages are provided by the architecture of the aircraft systems shown in the Figures. For example, at the engine gearbox 12, several components and associated gear centers are eliminated by this approach. The permanent magnet alternator (PMA), which supplies electric power to the engine, may be integrated into the starter/generator 18. This significantly reduces the size/cost of the gearbox. The simplified gearbox 18, along with the reduced bleed air valving and plumbing which is now required, simplifies the engine design and operation. As a result, one can achieve more efficient engine operation and longer engine life.

It is apparent that there has been provided in accordance with the present invention an improved aircraft architecture with a reduced bleed aircraft secondary power system which fully satisfies the objects, means and advantages set forth hereinbefore. While the present invention has been described in the context of specific embodiments thereof, other alternatives, modifications and variations will become apparent to those skilled in the art having read the foregoing description. Therefore, it is intended to embrace those alternatives, modifications and variations as fall within the broad scope of the appended claims.

What is claimed is:

1. An aircraft comprising a first engine, a first gearbox connected to said first engine, a first starter/generator associated with said first gearbox, a first motor drive connected to said first starter/generator for providing the first starter/generator with electrical power to start the first engine, an auxiliary power unit for supplying start-up electrical power to said first motor drive, said auxiliary power unit being connected to another starter/generator, another motor drive for controlling the speed of the another starter/generator so that said another starter/generator delivers conditioned electrical power to said first motor drive during start up, and said first motor drive receiving electric power from the first starter/generator after the first engine has been started to operate electrical systems onboard the aircraft.

2. An aircraft according to 1, further comprising a second engine, a second gearbox connected to said second engine, a second starter/generator connected to said second gearbox, and a second motor drive connected to said second starter/generator.

3. An aircraft according to claim 2, wherein said auxiliary power unit also supplies electrical power to said second motor drive to start up said second engine.

4. An aircraft according to claim 2, wherein said second starter/generator receives electrical power to start said second engine from said first starter/generator.

5. An aircraft according to claim 1, wherein said first motor drive provides electrical power to an environmental control system for delivering air to a cabin onboard said aircraft.

6. An aircraft according to claim 5, wherein said environmental control system comprises: a compressor, a cooling turbine, and an electric motor for driving said compressor and said cooling turbine; and said first motor drive supplies electrical power to said electric motor.

7. An aircraft according to claim 1, wherein said electrical systems include electric fuel controls and said first motor drive provides electrical power to said electric fuel controls.

8. An aircraft according to claim 1, wherein said electrical systems include electrically driven wing anti-icing devices and said first motor drive provides electrical power to said electrically driven wing anti-icing devices.

9. An aircraft according to claim 1, further comprising a ram air turbine to supply emergency power.

10. An aircraft according to claim 1, further comprising at least one battery onboard said aircraft to supply emergency power.

11. An aircraft according to claim 1, further comprising means for de-icing a cowl and said first engine supplying bleed air to said cowl de-icing means.

12. An aircraft according to claim 1, further comprising said first gearbox providing power to at least one of a deoiler, a lubrication system pump, a fuel metering unit, and a fuel system pump.

13. An aircraft according to claim 1, wherein said first gearbox is connected to said first engine via an angle gearbox and a bevel gear.

14. An aircraft according to claim 1, further comprising a control unit for regulating voltage connected to said first starter/generator.

15. An aircraft according to claim 1, wherein said first motor drive provides electrical power to an environmental control system for said aircraft, a control system for said aircraft, a wing anti-icing system, and an aircraft fuel system.

16. An aircraft comprising a first engine, a first gearbox connected to said first engine, a first starter/generator associated with said first gearbox, and a first motor drive connected to said first starter/generator for providing the first starter/generator with electrical power to start the first engine, said first motor drive receiving electrical power from the first starter/generator after the first engine has been started to operate electrical systems onboard the aircraft, an auxiliary power unit for supplying start-up electrical power to said first motor drive, and said auxiliary power unit comprising a bleedless turboalternator.

17. An aircraft comprising:
a first engine, a first gearbox connected to said first engine, a first starter/generator associated with said first gearbox, and a first motor drive connected to said first starter/generator for providing the first starter/generator with electrical power to start the first engine;
said first motor drive receiving electrical power from the first starter/generator after the first engine has been started to operate electrical systems onboard the aircraft;
said first motor drive providing electrical power to an environmental control system for delivering air to a cabin onboard said aircraft;
said environmental control system comprising a compressor, a cooling turbine, and an electric motor for driving said compressor and said cooling turbine;
said first motor drive supplying electrical power to said electric motor; and
said environmental control system further comprising said compressor receiving ram air and adding energy to said ram air, heat exchanger means for removing compression heat from said ram air, a reheater heat exchanger for initially cooling said ram air exiting said heat exchanger means and subsequently adding heat to said ram air, a condenser for removing moisture from said ram air, and said cooling turbine expanding said ram air prior to delivering said ram air to said cabin.

18. An aircraft according to claim 17, wherein said environmental control system further comprises at least one recirculating fan to recirculate at least a portion of air exiting said cabin.

19. An aircraft comprising a first engine, a first gearbox connected to said first engine, a first starter/generator associated with said first gearbox, and a first motor drive connected to said first starter/generator for providing the first starter/generator with electrical power to start the first engine, and said first motor drive receiving electrical power from the first starter/generator after the first engine has been started to operate electrical systems onboard the aircraft; a hydraulically operated system and a local hydraulic center connected to said hydraulically operated system; said local hydraulic center including an electric hydraulic pump; and said first motor drive supplying electrical power to said electric hydraulic pump.

20. An aircraft according to claim 19, further comprising an auxiliary power unit for supplying start-up electrical power to said first motor drive.

21. An aircraft according to claim 20, further comprising:
another starter/generator and another motor drive connected to said auxiliary power unit; and a battery connected to said another motor drive for providing electrical power to start said another starter/generator and said auxiliary power unit.

22. An aircraft according to claim 21, wherein said auxiliary power unit, said another starter/generator, said another motor drive, and said battery are located onboard said aircraft.

23. An aircraft according to claim 21, wherein said auxiliary power unit, said another starter/generator, said another motor drive, and said battery are located in a tail portion of said aircraft.

24. An aircraft according to claim 19, wherein said hydraulically operated system comprises a system for operating aircraft control surfaces and said local hydraulic center is located in a tail region of said aircraft.

25. An aircraft according to claim 19, wherein said hydraulically operated system comprises means for supplying hydraulic fluid to operate aircraft landing gear, aircraft steering system and aircraft brakes and said local hydraulic center is located in a nose portion of said aircraft.

26. An aircraft according to claim 19, wherein said hydraulically operated system comprises means for supplying hydraulic fluid to aircraft control surfaces and said local hydraulic center is located in an aircraft fuselage.

27. An aircraft comprising a first engine, a first gearbox connected to said first engine, a first starter/generator associated with said first gearbox, and a first motor drive connected to said first starter/generator for providing the first starter/generator with electrical power to start the first engine, said first motor drive receiving electrical power from the first starter/generator after the first engine has been started to operate electrical systems onboard the aircraft, at least one electric hydraulic actuator positioned in a wing to operate an aircraft control system and said first motor drive providing electrical power to said at least one electric hydraulic actuator.

28. A method for providing starting power to an aircraft and for generating electrical power to operate aircraft systems comprising the steps of:

providing a first starter/generator connected to an engine and a first motor drive connected to said first starter/generator;

supplying electrical power to said first motor drive;

conditioning said electrical power with said first motor drive and delivering said conditioned electrical power to said first starter/generator;

starting said engine with power from said first starter/generator;

said electrical power supplying step comprising providing an auxiliary power unit, another starter/generator connected to said auxiliary power unit, another motor drive, and a battery;

providing power from said battery to said another starter/generator through said another motor drive;

controlling the speed of said another starter/generator with said another motor drive as said another starter/generator starts said auxiliary power unit;

operating said another starter/generator after said auxiliary power unit has been started; and supplying said electrical power from said another starter/generator to said first motor drive.

29. A method for providing starting power to an aircraft and for generating electrical power to operate aircraft systems comprising the steps of:

providing a first starter/generator connected to an engine and a first motor drive connected to said first starter/generator;

supplying electrical power to said first motor drive;

conditioning said electrical power with said first motor drive and delivering said conditioned electrical power to said first starter/generator;

starting said engine with power from said first starter/generator; and operating said first starter/generator in a generate mode after said engine has started.

30. A method according to claim 29, further comprising supplying electrical power from said first starter/generator to a second starter/generator to start a second engine.

31. A method according to claim 29, further comprising supplying electrical power from said first starter/generator to said first motor drive and supplying conditioned electrical power from said first motor drive to electrical systems onboard said aircraft.

32. A method according to claim 31, wherein said conditioned electrical power supplying step comprises supplying electrical power to an electrical motor for operating a compressor and a cooling turbine in an environmental control system onboard said aircraft.

33. A method according to claim 31, wherein said conditioned electrical power supplying step comprises supplying electrical power to an electrically powered wing anti-icing system.

34. A method according to claim 31, wherein said conditioned electrical power supplying step comprises supplying electrical power to at least one electrically operated hydraulic pump for supplying hydraulic fluid to an aircraft control system.

35. A method according to claim 31, wherein said conditioned electrical power supplying step comprises supplying electrical power to at least one wing positioned electric hydraulic actuator for operating at least one aircraft control surface.

36. A method for providing starting power to an aircraft and for generating electrical power to operate aircraft systems comprising the steps of:

providing a first starter/generator connected to an engine and a first motor drive connected to said first starter/generator;

supplying electrical power to said first motor drive;

conditioning said electrical power with said first motor drive and delivering said conditioned electrical power to said first starter/generator;

starting said engine with power from said first starter/generator; and bleeding air from said engine after said engine has been started to provide cowl de-icing.

37. A method according to claim 36, wherein said air bleeding step comprises providing engine bleed air to a cowl de-icing system via a single bleed port.

* * * * *

UNITED STATES PATENT AND TRADEMARK OFFICE
CERTIFICATE OF CORRECTION

PATENT NO. : 6,704,625 B2
APPLICATION NO. : 10/076898
DATED : March 9, 2004
INVENTOR(S) : Jose Albero et al.

It is certified that error appears in the above-identified patent and that said Letters Patent is hereby corrected as shown below:

On the title page, item [73];
The assignee "Hamilton Sunstrand Corporation" should be corrected to read
--Hamilton Sundstrand Corporation--.

Signed and Sealed this

Third Day of June, 2008

JON W. DUDAS
*Director of the United States Patent and Trademark Office*